United States Patent
Flaherty et al.

(10) Patent No.: US 9,978,227 B2
(45) Date of Patent: May 22, 2018

(54) KEYLESS ENTRY DEVICE FOR HAPTIC COMMUNICATIONS

(71) Applicant: Immersion Corporation, San Jose, CA (US)

(72) Inventors: Natasha Margaret Minenko Flaherty, Belmont, CA (US); David M. Birnbaum, Oakland, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days. days.

(21) Appl. No.: 15/582,726

(22) Filed: Apr. 30, 2017

(65) Prior Publication Data

US 2017/0236387 A1 Aug. 17, 2017

Related U.S. Application Data

(63) Continuation of application No. 13/926,828, filed on Jun. 25, 2013, now Pat. No. 9,666,040, which is a (Continued)

(51) Int. Cl.
| | |
|---|---|
| *B60R 25/00* | (2013.01) |
| *G05B 19/00* | (2006.01) |
| *G05B 23/00* | (2006.01) |
| *G06F 7/00* | (2006.01) |
| *G06F 7/04* | (2006.01) |
| *G08B 29/00* | (2006.01) |
| *G08C 19/00* | (2006.01) |
| *H04B 1/00* | (2006.01) |
| *H04B 3/00* | (2006.01) |
| *H04Q 1/00* | (2006.01) |

(Continued)

(52) U.S. Cl.
CPC .............. *G08B 6/00* (2013.01); *G01S 11/06* (2013.01); *G01S 11/10* (2013.01); *G01S 19/14* (2013.01)

(58) Field of Classification Search
CPC .............. B60R 25/1003; B60R 25/104; B60R 25/2009; B60R 25/102; B60R 2325/202; B60R 25/1004; B60R 2025/1016; G07C 9/00182; G08B 13/19684; G08B 1/08; G08B 25/10; H04M 9/047
USPC ............... 340/5.72, 566, 683, 7.6, 425.5
See application file for complete search history.

(56) References Cited

U.S. PATENT DOCUMENTS

| | | |
|---|---|---|
| 5,973,592 A | 10/1999 | Flick |
| 6,140,938 A | 10/2000 | Flick |

(Continued)

OTHER PUBLICATIONS

Cohen et al., "Refreshment policies for Web content caches", Computer Networks, Nov. 8, 2001, 14 pages.

(Continued)

*Primary Examiner* — Emily C Terrell
(74) *Attorney, Agent, or Firm* — Miles & Stockbridge P.C.

(57) ABSTRACT

A keyless entry device is provided. The keyless entry device includes a transceiver, a haptic actuator coupled to a drive circuit, and a processor coupled to the transceiver and the drive circuit. The transceiver communicates with a vehicle over a communication channel. The processor determines proximity information between the keyless entry device and the vehicle, selects a control signal based on the proximity information, and outputs the control signal to the drive circuit to cause the haptic actuator to periodically or continuously generate a haptic effect to a user.

20 Claims, 5 Drawing Sheets

Related U.S. Application Data continuation of application No. 12/696,388, filed on Jan. 29, 2010, now Pat. No. 8,493,177.

(51) Int. Cl.
*H04Q 9/00* (2006.01)
*G08B 6/00* (2006.01)
*G01S 19/14* (2010.01)
*G01S 11/06* (2006.01)
*G01S 11/10* (2006.01)

(56) References Cited

U.S. PATENT DOCUMENTS

| | | |
|---|---|---|
| 6,259,362 B1 | 7/2001 | Lin |
| 6,470,196 B1 | 10/2002 | Yamashita |
| 6,476,712 B1 | 11/2002 | Achterholt |
| 6,624,758 B1 | 9/2003 | Omata et al. |
| 6,653,930 B1 | 11/2003 | Bonomo et al. |
| 6,812,833 B2 | 11/2004 | Rothkop et al. |
| 6,850,150 B1 | 2/2005 | Ronkainen |
| 7,124,002 B2 | 10/2006 | Yamamoto |
| 7,167,083 B2 | 1/2007 | Giles |
| 7,298,246 B1 | 11/2007 | Schmitt |
| 7,352,274 B2 | 4/2008 | Omata et al. |
| 7,466,216 B2 | 12/2008 | Kawamura et al. |
| 7,504,931 B2 | 3/2009 | Nguyen |
| 7,663,508 B2 | 2/2010 | Teshima et al. |
| 7,844,377 B2 | 11/2010 | Oota et al. |
| 8,050,815 B2 | 10/2011 | Perry et al. |
| 8,159,324 B2 | 4/2012 | Zellweger et al. |
| 8,316,166 B2 | 11/2012 | Grant et al. |
| 2002/0067253 A1 | 6/2002 | Trajkovic |
| 2002/0109587 A1 | 8/2002 | Attring et al. |
| 2003/0076298 A1 | 4/2003 | Rosenberg |
| 2005/0099275 A1 | 5/2005 | Kamdar et al. |
| 2005/0162260 A1 | 7/2005 | Gupte et al. |
| 2005/0184862 A1 | 8/2005 | Nagata |
| 2006/0028339 A1 | 2/2006 | Ogino et al. |
| 2006/0220806 A1 | 10/2006 | Nguyen |
| 2006/0220834 A1 | 10/2006 | Maeng |
| 2006/0273930 A1* | 12/2006 | Godden ............... G08G 1/0962 340/988 |
| 2008/0117166 A1 | 5/2008 | Rosenberg |
| 2008/0204266 A1 | 8/2008 | Malmberg et al. |
| 2008/0204281 A1 | 8/2008 | Sugiura et al. |
| 2008/0221743 A1 | 9/2008 | Schwarz et al. |
| 2008/0309451 A1 | 12/2008 | Zellweger |
| 2009/0005936 A1 | 1/2009 | Browne et al. |
| 2010/0128570 A1 | 5/2010 | Smith et al. |
| 2010/0141412 A1 | 6/2010 | Partin et al. |
| 2010/0217457 A1 | 8/2010 | Georgi et al. |
| 2011/0021213 A1 | 1/2011 | Carr |

OTHER PUBLICATIONS

Simitsis, "Optimizing Analytic Data Flows for Multiple Execution Engines", May 20-24, 2012.
Chemolli, SquidFaq, InnerWorkings, Squid Web Proxy Wiki, Oct. 27, 2013, 17 pages.
Twilio, Inc., "TwiML Message: Twilio's Request", Mar. 26, 2013, 2 pages.
Mobivate, "psms aggregator", Jan. 14, 2013, 3 pages.
Ford, "IT Research BYTE LOL: Laugh out Loud or Lots of Love?", Integrating SMS into Ford Business Processes, Jun. 25, 2010, 6 pages.
Tata Communications, "Mobile Messaging Exchange", 2013, 2 pages.
ExactTarget, "SMS Marketing Term of the Day: Aggregator", Jun. 30, 2009, 3 pages.
Aruhat, "SMS Aggregators: Make sure that your gateways are the best used to give Excellent Services", Mar. 28, 2014, 6 pages.

* cited by examiner

KEYLESS ENTRY DEVICE FOR HAPTIC COMMUNICATIONS

CROSS-REFERENCE TO RELATED APPLICATIONS

This application is a continuation of U.S. patent application Ser. No. 13/926,828 (filed on Jun. 25, 2013), which is a continuation of U.S. patent application Ser. No. 12/696,388 (filed on Jan. 29, 2010) now U.S. Pat. No. 8,493,177 (issued on Jul. 23, 2013), the contents of which are incorporated herein by reference in their entireties.

FIELD

The invention relates to systems, devices, and methods for communicating vehicle information from a vehicle to a keyless entry device using haptic feedback.

BACKGROUND

Keyless entry devices enable a user to control various vehicle functions. For example, the user may use a key fob to send one or more commands to a car that causes the car to lock and unlock doors, open and close windows, arm and disarm a security system, and perform other vehicle functions.

Typically, the vehicle does not communicate information to the keyless entry device. Thus, although the vehicle may respond to such commands, the vehicle does so by generating audio and/or visual cues at the vehicle and not at the keyless entry device. For instance, a car may sound a horn or flash its lights in response to a user sending a command to lock the car doors.

However, one or both of these responses may be inappropriate when the user wishes to discretely control vehicle functions or when the user is unable to discern such responses. For example, a user may not wish to disturb neighbors with an audible sound or flashing lights; a hearing-impaired user may not hear a horn and/or other sound that responds to a command to lock the car doors.

Another result of failing to communicate vehicle information to keyless entry devices is that existing systems communicate vehicle information (such as maintenance reminders or warnings) to the user in the form of lights or messages that are displayed inside the vehicle. Accordingly, the user must typically be inside the vehicle to receive the vehicle information. However, the user may ignore, not notice, forget about, or otherwise not receive the vehicle information. Another result of failing to communicate vehicle information to keyless entry devices is that existing systems may fail to notify the user of warnings before the user arrives at the vehicle. For example, a car may determine that there exists a dangerous condition (such as a break-in in progress or unauthorized entry into the car). Existing systems may not alert the user before the user arrives at the car. Another result of failing to communicate vehicle information to keyless entry devices is that existing systems fail to help a user locate a vehicle. Thus, oftentimes users employ inadequate techniques to locate the vehicle using existing systems. For instance, the user may park a car in a crowded parking lot and forget where the car is parked. The user may attempt to find the car by sending a command to the car and then looking for flashing lights or listening for an audible sound made by the car in response to the command. However, flashing lights may be difficult to see during daylight while the audible sound may be difficult to hear in a noisy parking lot.

These and other drawbacks exist.

SUMMARY

Embodiments of the present invention advantageously provide a keyless entry device, a method for generating haptic feedback at a keyless entry device, and a computer-readable medium storing instructions that, when executed by a processor of a keyless entry device, cause the keyless entry device to generate haptic feedback.

In certain embodiments, a keyless entry device includes a transceiver, a haptic actuator coupled to a drive circuit, and a processor coupled to the transceiver and the drive circuit. The transceiver communicates with a vehicle over a communication channel. The processor determines proximity information between the keyless entry device and the vehicle, selects a control signal based on the proximity information, and outputs the control signal to the drive circuit to cause the haptic actuator to periodically or continuously generate a haptic effect to a user.

DETAILED DESCRIPTION

Figure 1:
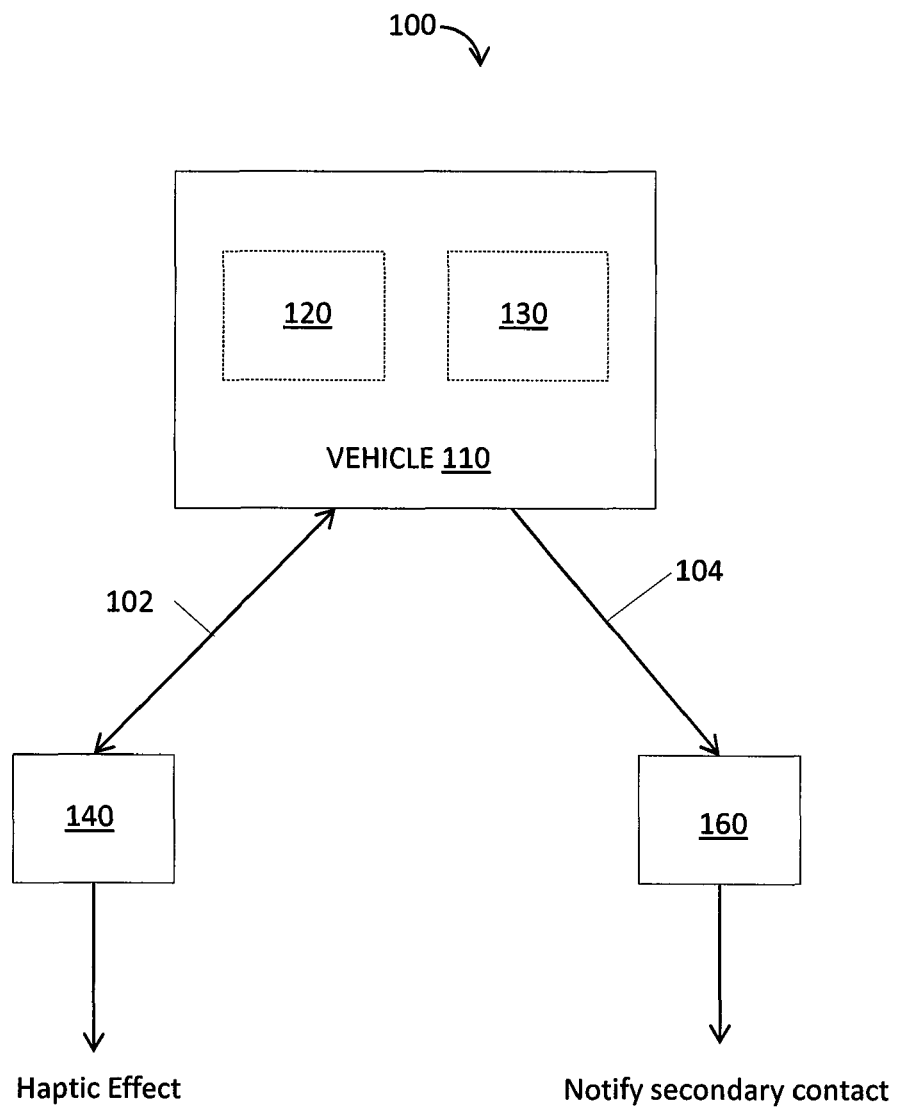
FIG. 1 is a block diagram of an exemplary system for haptically communicating vehicle information from a vehicle to a keyless entry device via a communication channel and/or to a secondary contact via another communication channel, according to various implementations of the invention.

Various implementations of the invention relate to systems, devices and methods for communicating vehicle information from a vehicle communicably coupled to a keyless entry device operated by a user. The system may include a vehicle device coupled to the vehicle that may obtain vehicle information that is related to the vehicle. The vehicle device may generate a control signal based on the vehicle information such that different control signals may be generated for different vehicle information. The vehicle device may communicate the control signal to the keyless entry device. The control signal may cause the keyless entry device to output one or more haptic effects (interchangeably referred to hereinafter as "haptic effect" or "haptic effects"), thereby haptically communicating the vehicle information at the keyless entry device.

In some implementations of the invention, the keyless entry device may communicate to the vehicle a command to perform one or more vehicle functions. The vehicle may communicate to the keyless entry device a response, which may include the control signal, to the command. In some implementations of the invention, the response may acknowledge receipt of the command. In some implementations of the invention, the response may be related to the command. For example, the response may include a confirmation that the command has been successfully performed. Thus, the user may receive a haptic effect at the keyless entry device that indicates that the command is complete. In some implementations of the invention, the response may be unrelated to the command. For example, the response may include vehicle information (such as an oil change reminder), thereby causing a haptic effect at the keyless entry device that communicates the oil change reminder. In this manner, the user may receive haptic effects at the keyless entry device in response to commands communicated from the keyless entry device to the vehicle.

In some implementations of the invention, the keyless entry device may receive the control signal prior to communicating the command to the vehicle. For example, a communication channel between the keyless entry device and the vehicle may be established when the two are in communication range of one another. The vehicle may communicate the control signal to the keyless entry device before the keyless entry device communicates the command to the vehicle, thereby proactively alerting the user of the vehicle information. For instance, the vehicle may communicate proximity information that may indicate that the vehicle and the keyless entry device are within communication range of one another. In this manner, the user may receive haptic effects corresponding to vehicle information at the keyless entry device without handling the keyless entry device (such as when the keyless entry device is in the user's pocket).

In some implementations of the invention, different haptic effects may be output by the keyless entry device depending on a distance and/or signal strength of the communication channel between the vehicle and the keyless entry device. In this manner, the user may receive different haptic effects at the keyless entry device based on the distance between the vehicle and the keyless entry device.

In some implementations of the invention, the keyless entry device may store the control signal for periodic or substantially continuous haptic effects that remind the user of the vehicle information.

In some implementations of the invention, the vehicle device may communicate the vehicle information to a secondary contact. The vehicle information may be communicated to the secondary contact when the keyless entry device does not indicate receipt of the vehicle information. In this manner, when a user ignores or otherwise does not respond to a vehicle warning that indicates a safety problem of the vehicle, for example, the vehicle device may communicate the vehicle information to the secondary contact.

FIG. 1 is a block diagram of an exemplary system 100 for haptically communicating vehicle information from vehicle 110 to keyless entry device 140 via communication channel 102 and/or to secondary contact 160 via communication channel 104, according to various implementations of the invention. "Haptically communicating" or haptic communication refers to communicating information by causing an output of one or more different haptic effects for different information. A haptic effect may include one or more vibratory sensations, pulse sensations, and/or other touch sensations.

Vehicle 110 may be a car, a boat, a motorcycle, or other vehicle operated by a user and having one or more vehicle functions that may be controlled by keyless entry device 140. Keyless entry device 140 may include a remote key fob, a smart key, a cellular device, and/or other device that may be used to communicate one or more commands to a vehicle instructing the vehicle to perform one or more vehicle functions. Vehicle functions may include, for instance, locking and/or unlocking doors, opening and/or closing windows, arming and/or disarming a security system, and/or other vehicle functions that may be remotely controlled.

Secondary contact 160 may include, for instance, a computing and/or other communication device used by a third party such as a spouse of the user, an emergency services operator (such as a police operator, fire department operator, or other emergency call center operator), and/or other person or entity that may receive the vehicle information.

According to various implementations of the invention, the vehicle information may include maintenance information, warning information, response information, proximity information, and/or other information related to vehicle 110. In some implementations, the vehicle information may be communicated to keyless entry device 140 as a control signal.

Maintenance information may include, for instance, an oil change reminder, low fuel indication, and/or other information related to maintaining the vehicle. Thus, the user may be informed of maintenance information, for example, through keyless entry device 140.

Warning information may include, for instance, an indication that a security system of vehicle 110 has been triggered, an indication that an individual is inside and/or nearby vehicle 110, an indication that one or more tires of vehicle 110 have an unsafe level of tire pressure, and/or other information that may alert the user to a dangerous condition of vehicle 110. In this manner, the user may be alerted to dangerous conditions at keyless entry device 140 before arriving at vehicle 110.

Response information may include, for instance, information that is a reply to one or more commands from keyless entry device 140. For example, the response information may include a status of the one or more commands such as confirmation that one or more commands have been received and/or that one or more vehicle functions have been performed by vehicle 110. In this manner, the user may receive from vehicle 110 a response to the command.

Proximity information may include, for instance, information indicating a signal strength and/or distance between vehicle 110 and keyless entry device 140. Proximity information may indicate to the user of keyless entry device 140 that the user is within communication range of vehicle 110. For example, the proximity information may indicate that vehicle 110 and keyless entry device 140 are within communication range of one another (i.e., communication channel 102 may be established). This may be useful when, for instance, a user attempts to locate vehicle 110, when a user is unaware that a smart key has established a communication with vehicle 110, when different haptic effects should be communicated to the user as the user approaches or gets further from vehicle 110, and/or other situations where indicating proximity between keyless entry device 140 and vehicle 110 are useful.

According to various implementations of the invention, vehicle 110 may include a vehicle device 120 (described below with reference to FIG. 2) that obtains the vehicle information and generates a control signal based on the vehicle information. The control signal may be output to keyless entry device 140 (described below with reference to FIGS. 3 and 4) over communication channel 102 and/or to a vehicle interface device 130 (described below with reference to FIG. 5).

According to various implementations of the invention, communication channel 102 may include a short-range radio transmission channel or other known short-range communication transmissions used for keyless entry systems. In some implementations of the invention, the control signal may cause keyless entry device 140 and/or vehicle interface device 130 to output a haptic effect.

According to various implementations of the invention, vehicle device 120 may communicate the vehicle information to secondary contact 160 using communication channel 104. Communication channel 104 may include a network such as the Internet, a telephone network such as a Public Switched Telephone Network, a long-range radio transmission network, and/or other long-range communication network.

According to some implementations of the invention, the vehicle information is communicated to secondary contact 160 when vehicle device 120 does not receive an indication that a user of keyless entry device 140 and/or vehicle interface device 130 has received the vehicle information. In this manner, secondary contact 160 may receive the vehicle information when the user has not indicated receipt of the vehicle information. In other words, according to some implementations, secondary contact 160 may be a backup contact when the user does not respond to or otherwise does not acknowledge receipt of the vehicle information.

Figure 2:
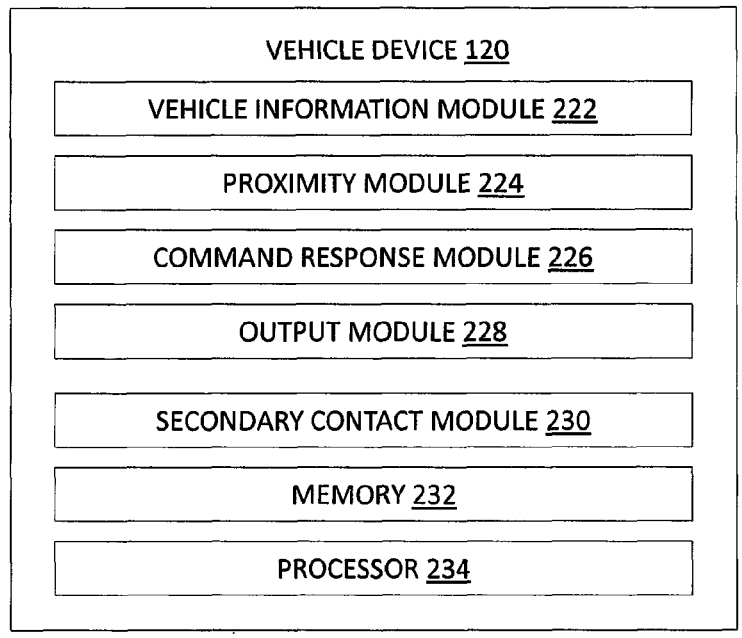
FIG. 2 is a block diagram of an exemplary vehicle device for communicating vehicle information from a vehicle to a keyless entry device, according to various implementations of the invention.

FIG. 2 is a block diagram of an exemplary vehicle device 120 for communicating vehicle information from vehicle 110 to keyless entry device 140, according to various implementations of the invention. Through various modules, vehicle device 120 may obtain the vehicle information, receive commands to perform vehicle functions, generate and output a control signal that causes a haptic effect to communicate the vehicle information, and/or perform other functions. Vehicle device 120 may include, for instance, a vehicle information module 222, a proximity module 224, a command response module 226, an output module 228, a secondary contact module 230, a memory 232, a processor 234, and/or other suitable modules.

According to various implementations of the invention, vehicle information module 222 may obtain (i.e., receive and/or retrieve) the vehicle information. To obtain the vehicle information, vehicle information module 222 may include or otherwise interface with one or more known computing systems (not otherwise illustrated in FIG. 2) that report or otherwise monitor vehicle information functions of vehicle 110 that report the vehicle information. The vehicle information functions may include, for example, diagnostic functions that troubleshoot problems with the vehicle, maintenance functions that keep track of scheduled or other vehicle maintenance, monitoring functions that monitor a presence of individuals inside or nearby vehicle 110, sensor functions that determine whether the security system of vehicle 110 has been or should be triggered, and/or other functions that may observe a condition of vehicle 110.

According to various implementations of the invention, proximity module 224 may determine whether vehicle 110 and keyless entry device 140 are in communication range. According to various implementations of the invention, vehicle 110 and keyless entry device 140 are in communication range when there exists sufficient signal strength of a communication transmitted from vehicle 110 and received by keyless entry device 140 and/or vice versa. Proximity module 224 may measure the signal strength using known techniques. According to various implementations of the invention, the signal strength may be sufficient when a distance between vehicle 110 and keyless entry device 140 is sufficiently small.

According to various implementations of the invention, proximity module 224 may determine the distance by Global Positioning System information from keyless entry device 140 and vehicle 110, estimating signal strength of a communication keyless entry device 140, Doppler shift effects of a signal communicated from keyless entry device 140, and/or other appropriate technique to determine the distance.

According to various implementations of the invention, proximity module 224 may determine the distance and/or signal strength at one or more time points such that the distance between vehicle 110 and keyless entry device 140 may be tracked over time. In this manner, vehicle 110 may determine whether keyless entry device 140 is moving closer to or moving away from vehicle 110 and/or whether a user is moving from an area having one level of signal strength to another area having a different level of signal strength.

According to various implementations of the invention, vehicle device 120 may vary the haptic effects as a function of the distance. In these implementations, vehicle device 120 may cause different haptic effects based on the distance and/or signal strength between vehicle 110 and keyless entry device 140. In other words, vehicle device 120 may cause different haptic effects by, for instance, increasing (or decreasing) the magnitude of force, changing a type of vibration (such as from constant vibration to pulsing vibration), and/or otherwise altering the haptic effects that are generated at keyless entry device 140 and/or vehicle interface device 130.

In some implementations, vehicle device 120 may cause different haptic effects by generating a first control signal that causes a first haptic effect and generating a second control signal that causes a second haptic effect. Vehicle device 120 may communicate the first control signal at a first distance between vehicle 110 and keyless entry device 140 and may communicate the second control signal at a second distance between vehicle 110 and keyless entry device 140, thereby causing different haptic effects at different distances.

In some implementations, the first control signal and the second control signal may be communicated to keyless entry device 140 at substantially the same time. In this manner, keyless entry device 140 may receive the first control signal and the second control signal at substantially the same time and use the first control signal to generate the first haptic effect at the first distance and use the second control signal to generate the second haptic effect at the second distance. In some implementations, a single control signal may cause keyless entry device 140 to output different haptic effects at different distances.

In some implementations, when keyless entry device 140 is moved away from vehicle 110, vehicle device 120 may detect an increased distance and/or decreased signal strength as compared to a prior distance and/or signal strength. Vehicle device 120 may cause keyless entry device 140 to output a different haptic effect as compared to when keyless entry device 140 is closer to vehicle 110. For example, vehicle 110 may determine that the user is moving away from vehicle 110 and may cause a stronger haptic effect to be generated at keyless entry device 140 as compared to when the user is closer, thereby communicating a stronger message before the user moves out of communication range.

In some implementations, as keyless entry device 140 approaches vehicle 110, vehicle device 120 may cause a different haptic effect (such as a stronger haptic effect) as compared to when the user is further from vehicle 110. For example, a user may attempt to locate vehicle 110 in a parking lot. Vehicle device 120 may determine that keyless entry device 140 and vehicle 110 are within communication range and cause a first haptic effect to be output at keyless entry device 140. As the user carrying keyless entry device 140 gets closer to vehicle 110, vehicle device 120 may cause keyless entry device 140 to output a second haptic effect different from the first haptic effect, thereby communicating to the user that the distance has changed. In an example operation, the user may feel a stronger (or otherwise different) haptic effect from keyless device 140 as the user approaches vehicle 110. Thus, vehicle device 120 may haptically convey the proximity information to the user at keyless entry device 140, assisting the user to locate vehicle 110.

According to various implementations of the invention, when vehicle device 120 determines that keyless entry device 140 and vehicle 110 are within communication range of one another, vehicle device 120 may obtain the vehicle information and cause keyless entry device 140 to output a haptic effect that corresponds to the vehicle information, thereby communicating the vehicle information at keyless entry device 140.

In some implementations, vehicle device 120 may communicate the vehicle information prior to receiving a command from keyless entry device 140. For example, the vehicle information may include the proximity information to keyless entry device 140, thereby alerting the user that keyless entry device 140 is within communication range of vehicle 110. This may be useful when keyless entry device 140 is a smart key that may perform vehicle functions such as unlocking a car door without a user pressing a button or otherwise interacting with keyless entry device 140. Thus, vehicle device 120 may proactively alert the user by haptically communicating the vehicle information to keyless entry device 140 after communication channel 102 is established and before vehicle device 120 receives a command from keyless entry device 140.

According to various implementations of the invention, command response module 226 may receive an indication that a command to perform one or more vehicle functions has been received from keyless entry device 140. Once the indication is received, command response module 226 may respond to the command by communicating a response to keyless entry device 140. In some implementations, the response may cause keyless entry device 140 to output a haptic effect, thereby haptically communicating the response at keyless entry device 140.

According to various implementations of the invention, the response may be related to the command. For example, the response may include vehicle information that indicates a status of the command. The status may include an indication of whether the command has been successfully performed. In some implementations, the status may acknowledge receipt of the command, indicate whether the one or more functions in response to the command have been completed, and/or other information that indicates the status of the command. In operation, a user may press a lock button (for example) of keyless entry device 140, causing keyless entry device 140 to communicate a command to vehicle 110 to lock car doors. Command response module 226 may receive an indication that the command has been received and may communicate a response to keyless entry device 140. The response may cause keyless entry device 140 to output a haptic effect, thereby haptically communicating the response at keyless entry device 140.

According to various implementations of the invention, the response may be unrelated to the command. For example, the response may include vehicle information such as maintenance information when the command is unrelated to vehicle maintenance. In some implementations, a user may press a lock button of keyless entry device 140, causing keyless entry device 140 to communicate a command to vehicle 110 to lock car doors. Command response module 226 may receive an indication that the command has been received and may communicate a control signal corresponding to an oil change reminder to keyless entry device 140. The oil change reminder may cause keyless entry device 140 to output a haptic effect, thereby haptically communicating the oil change reminder at keyless entry device 140. In this manner, when command response module 226 receives an indication that a command has been communicated from keyless entry device 140, vehicle device 120 may haptically communicate vehicle information that is unrelated to the command to keyless entry device 140.

According to various implementations of the invention, output module 228 may communicate the vehicle information to keyless entry device 140. In some implementations, output module 228 may encode the vehicle information as a control signal that causes keyless entry device 140 to output a haptic effect. The control signal may include, for instance, a signal that directly causes keyless entry device 140 to output a haptic effect, a signal that includes a code (such as binary, text, or other code) that is decoded at or otherwise translated by keyless entry device 140 to cause the haptic effect, and/or other information that causes keyless entry device 140 to output the haptic effect.

According to various implementations of the invention, output module 228 may include or otherwise interface with a transceiver (not otherwise illustrated in FIG. 2) in order to establish communication channel 102 and/or communication channel 104. Output module 228 may secure communication channel 102 using known techniques, such as, for example, rolling code verification. Communication channel 102 may be secured to prevent vehicle 110 from communicating with a keyless entry device not paired with or otherwise configured to receive communication with vehicle 110 (and vice versa).

In some implementations, a new rolling code may be established when vehicle device 120 responds to keyless entry device 140, thereby preventing communications from vehicle 110 from being received by keyless entry devices not paired with or otherwise not configured to communicate with vehicle 110.

In some implementations, "communication channel" may include more than one such instance of generating a new rolling code between vehicle 110 and keyless entry device 140. For example, a rolling code may be used to establish communication channel 102 when keyless entry device 140 sends a command to vehicle 110. In response, vehicle 110 may use a new rolling code to send a response on communication channel 102 to keyless entry device 140. In this manner, more than one rolling code may be used to establish and maintain communication channel 102.

According to various implementations of the invention, secondary contact module 230 may communicate the vehicle information to a third party individual or other entity via secondary contact 160. In some implementations, secondary contact module 230 may communicate the vehicle information to the third party when keyless entry device 140 has not acknowledged receipt of the vehicle information communicated from vehicle 110.

According to various implementations of the invention, memory 232 may store the vehicle information and/or other information for communicating with keyless entry device 140. In some implementations, memory 232 may store a control signal table that maps the vehicle information to different haptic effects. For example, the control signal table may associate an "oil change reminder" maintenance information with a control signal that causes a particular haptic effect that haptically communicates the oil change reminder to be output by keyless entry device 140. According to various implementations of the invention, processor 234 may include one or more processors configured to perform various functions, such as the functions provided by vehicle device 120.

Figure 3:
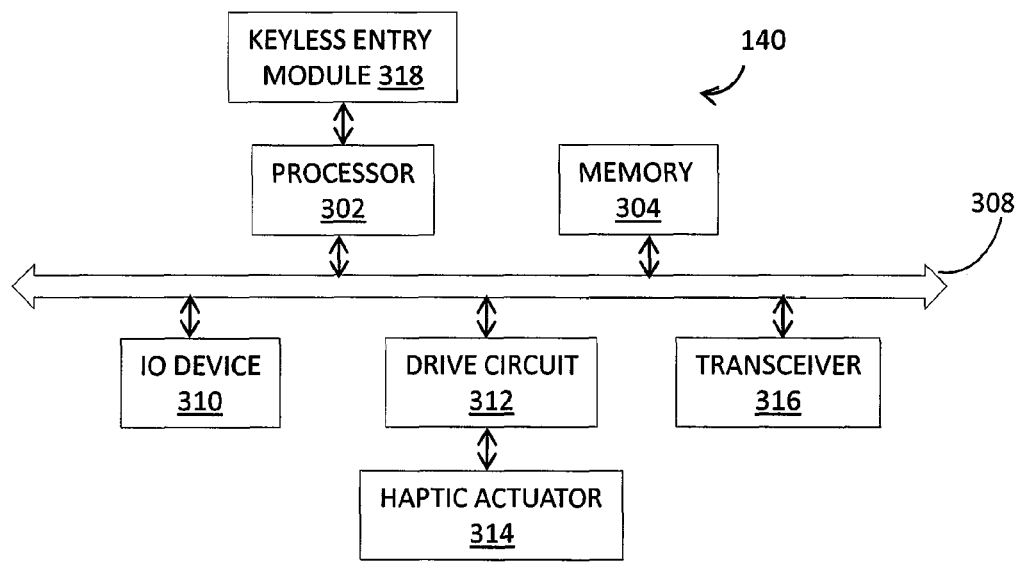
FIG. 3 is a block diagram of an exemplary keyless entry device for communicating vehicle information from a vehicle using haptic feedback, according to various implementations of the invention.

FIG. 3 is a block diagram of an exemplary keyless entry device 140 for communicating vehicle information from vehicle 110 using haptic feedback, according to various implementations of the invention. Through various modules, keyless entry device 140 may communicate one or more commands to vehicle 110, receive responses from vehicle 110, generate haptic effects caused by the responses, and/or perform other functions that facilitate communication to and from a user operating keyless entry device 140.

According to various implementations of the invention, keyless entry device 140 may include, for instance, a processor 302, a memory 304, a bus 308, input/output devices CIO device 310"), a drive circuit 312, a haptic actuator 314, a transceiver 316, and/or other appropriate modules that may facilitate communication to and from a user operating keyless entry device 140. In some implementations, various modules of keyless entry device 140 may use bus 308 to communicate with one another.

According to various implementations of the invention, processor 302 may include one or more processors that are configured to perform the functions provided by keyless entry device 140. Memory 304 may store the vehicle information, responses from vehicle 110, a table such as the control signal table described above, and/or other information for communicating with vehicle 110 and/or generating haptic effects.

According to various implementations of the invention, I/O device 310 may include user interface members (not otherwise illustrated in FIG. 3) that receive input from a user operating keyless entry device 140 and/or generate output to the user. I/O device 310 may include, for instance, a mechanical button, a touch screen, a touch panel, a microphone, a Light Emitting Diode, an audio speaker, and/or other mechanism for receiving input from the user and/or generating output to the user. When receiving input from the user, I/O device 310 may cause one or more commands to be communicated from keyless entry device 140 to vehicle 110. In some implementations, I/O device 310 may output visual and/or audio to the user. For example, the control signal from vehicle 110 may cause keyless entry device 140 to output haptic effects, audio effects, and/or visual effects (such as text, lights, and/or other visual output).

According to various implementations of the invention, drive circuit 312 may be coupled to haptic actuator 314. Drive circuit 312 may receive the control signal that causes haptic actuator 314 to generate one or more haptic effects. Haptic actuator 314 may include, for instance, a piezoelectric actuator, a rotating mass actuator, a solenoid, and/or other mechanism for generating haptic effects.

According to various implementations of the invention, transceiver 316 may send and/or receive communications from vehicle 110, thereby establishing communication channel 102 described above. In some implementations, transceiver 316 may secure communication channel 102, such as by using rolling code verification described above with regard to vehicle device 120. Transceiver 316 may communicate to vehicle 110 a command that causes vehicle 110 to perform one or more vehicle functions. In some implementations, transceiver 316 may receive a communication (such as the vehicle information) from vehicle 110.

According to various implementations of the invention, keyless entry module 318 may use transceiver 316 to establish communication channel 102, communicate one or more commands to vehicle 110, receive and react to communications from vehicle 110, and/or perform other functions of keyless entry device 140. Keyless entry module 318 may receive the control signal described above in relation to vehicle device 120 from vehicle 110. Keyless entry module 318 may cause haptic actuator 314 to output a haptic effect in response to the received control signal.

In some implementations, keyless entry module 318 may directly apply the control signal to haptic actuator 314 (via drive circuit 312, for example), thereby causing haptic actuator 314 to output a particular haptic effect. Thus, according to some implementations, the control signal may be encoded to directly cause haptic actuator 314 to output the particular haptic effect.

In some implementations, keyless entry module 318 may determine a particular haptic effect by mapping the control signal using the control signal table. In some implementations, keyless entry module 318 may decode the control signal and map the decoded control signal to a particular haptic effect. For example, the control signal may be decoded such that the decoded control signal indicates the vehicle information, such as an oil change reminder. Keyless entry module 318 may perform a lookup of the decoded control signal using control signal table (or otherwise using other haptic effect mappings stored in memory 304), which may map the vehicle information to the particular haptic effect to be output. Keyless entry module 318 may then cause haptic actuator 314 to output the particular haptic effect. In some implementations, keyless entry module 318 may use IO device 310 to display the vehicle information at keyless device 140 and/or output an audio sound that corresponds to the vehicle information. In some implementations of the invention, the control signal may directly cause the visual and/or audio effects. In some implementations, the control signal may be decoded (as described above) at keyless entry device 140 to cause the visual and/or audio effects.

According to various implementations of the invention, keyless entry module 318 may communicate a command to vehicle 110. For example, keyless entry module 318 may receive an indication that JO device 310 has been manipulated to communicate the command (such as lock car door). Keyless entry module 318 may attempt to initiate or otherwise attempt to establish communication channel 102 in order to communicate the command on communication channel 102. In some implementations, when the communication channel cannot be established (such as when keyless entry module 318 and vehicle 110 are not in communication range of one another) or when the command cannot otherwise be communicated to vehicle 110, keyless entry module 318 may cause haptic actuator 314 to generate a haptic effect that conveys the failure.

In some implementations, when communication channel 102 is established and after the command is communicated, keyless entry module 318 may receive the control signal from vehicle 110. In other words, keyless entry module 318 may receive a response to the command from vehicle 110.

In some implementations, the response may be related to the command. For example, the response may confirm receipt of the command or otherwise indicate a status of the command, as discussed above in relation to vehicle device 120. In some implementations, the response may be unrelated to the command. For example, the response may indicate vehicle information (that does not confirm receipt of the command or is otherwise unrelated to the command). For example, keyless entry device 140 may communicate a command to lock car doors and may receive a response from vehicle 110 that includes an oil change reminder, thereby receiving a response unrelated to the command.

According to various implementations of the invention, keyless entry module 318 may store the control signal or information derived from the control signal (collectively, "stored control signal") in memory 304. In some implementations, the control signal itself may be stored. For example, the control signal may be decoded and information from the decoded control signal may be stored.

In some implementations, keyless entry module 318 may periodically or continuously cause haptic actuator 314 to output a haptic effect based on the stored control signal. For example, the stored control signal may periodically cause haptic actuator 314 to output a haptic effect associated with the oil change reminder. In this manner, when keyless entry device 140 is moved out of communication range with vehicle 110, keyless entry module 318 may continue to haptically communicate the oil change reminder (or other vehicle information) at keyless entry device 140, thereby reminding the user of the oil change reminder when the user is away from vehicle 110 but still in contact (e.g., visual, audio, and/or tactile contact) with keyless entry device 140.

In some implementations, the stored control signal may cause actuator 314 to continuously output a haptic effect. For example, when keyless entry device 140 is moved out of communication range with vehicle 110, keyless entry module 318 may cause a continuous haptic effect to be output by actuator 314, thereby alerting the user of the vehicle information (such as a warning indicating a dangerous condition). In some implementations, keyless entry module 318 may deactivate the continuous haptic effect when the dangerous condition is resolved and/or otherwise acknowledged by the user (such as by returning to vehicle 110 or using JO device 310 to acknowledge receipt of the warning). In some implementations, keyless entry module 318 may cause haptic actuator 314 to output the haptic effect at a later time when the dangerous condition is not resolved. In other words, keyless entry device 140 may include a snooze feature to temporarily discontinue the haptic effects for a predetermined time.

According to various implementations of the invention, keyless entry module 318 may determine proximity information such as a distance and/or signal strength between keyless entry device 140 and vehicle 110. Thus, keyless entry module 318 may perform functions similar to functions provided by proximity module 224 described above in relation to vehicle device 120.

In some implementations, keyless entry module 318 may determine that keyless entry device 140 is in communication range with vehicle 110. In some implementations, keyless entry module 318 may establish communication channel 102 with vehicle 110 when keyless entry module 318 and vehicle 110 are in communication range of one another. Vehicle 110 or keyless entry module 318 may initiate establishment of communication channel 102. In other words, keyless entry device 140 may actively or passively establish communication channel 102.

In some implementations, when communication channel 102 is established, keyless entry module 318 may receive the control signal from vehicle 110 prior to communicating a command to vehicle 110. For example, keyless entry device 140 may include a smart key that does not require user intervention to communicate a command to vehicle 110. In this manner, when keyless entry device 140 is within communication range of vehicle 110, keyless entry module 318 may receive the control signal before sending the command.

According to various implementations of the invention, keyless entry module 318 may cause different haptic effects at different distances from vehicle 110 and/or signal strengths with vehicle 110.

In some implementations, keyless entry module 318 may receive a first control signal corresponding to a first distance and may receive a second control signal corresponding to a second distance. The first control signal may cause haptic actuator 314 to output a first haptic effect and the second control signal may cause haptic actuator 314 to output a second haptic effect different from the first haptic effect, thereby outputting different haptic effects at different distances and/or signal strengths. In this manner, keyless entry module 318 may cause a different haptic effect when keyless entry device 140 is moved closer to or further away from vehicle 110.

In some implementations, keyless entry module 318 may receive the first control signal and the second control signal at substantially the same time. In some implementations, keyless entry module 318 may store the first control signal and the second control signal in memory 304 such that the first haptic effect is output when keyless entry device 140 arrives at or otherwise exceeds the first distance and the second haptic effect is output when keyless entry device 140 arrives at or otherwise exceeds the second distance.

In some implementations, keyless entry module 318 may receive the first control signal and the second control signal at different times. For example, keyless entry device 140 may receive the first control signal when at or past the first distance thereby causing the first haptic effect and may receive the second control signal when at or past the second distance thereby causing the second haptic effect.

In some implementations, keyless entry module 318 may receive a single control signal that causes the first haptic effect at or past the first distance and the second haptic effect at or past the second distance. For example, the single control signal may be encoded such that keyless entry module 318 decodes the instructions encoded therein. The instructions may indicate the first distance, the first haptic effect, the second distance and the second haptic effect such that upon reaching or passing the first distance and the second distance, keyless entry module 318 causes actuator 314 to output the appropriate haptic effect.

In some implementations, keyless entry device 140 may use the proximity information to locate vehicle 110. For example, a user of keyless entry device 140 may attempt to find vehicle 110 in a parking lot. In some implementations, the user may send a command to vehicle 110 to initiate a vehicle locator function that helps a user locate vehicle 110. Vehicle 110 may respond to the command to initiate the vehicle locator function by communicating proximity information to keyless entry device 140. In other implementations, the user may manipulate 10 device 310 to instruct keyless entry device 140 to begin locating vehicle 110. Keyless entry device 140 may respond by, for example, determining the proximity information and generating haptic effects based on the proximity information.

In some implementations, as keyless entry device 140 gets closer to vehicle 110, keyless entry module 318 may cause haptic actuator 314 to output a stronger (or otherwise different) haptic effect as compared to when keyless entry device 140 is further from vehicle 110 and vice versa. In this manner, the user may be provided with a stronger (or otherwise different) haptic effect at keyless entry device 140 in order to help the user to locate vehicle 110, for example.

In some implementations, as keyless entry device 140 gets further from vehicle 110, keyless entry module 318 may cause haptic actuator 314 to output a stronger (or otherwise different) haptic effect as compared to when keyless entry device 140 is closer to vehicle 110 and vice versa. In this manner, the user may be provided with a stronger (or otherwise different) haptic effect at keyless entry device 140 in order to increase the likelihood that the user will notice the haptic communication before moving keyless entry device 140 out of communication range with vehicle 110.

Thus, based on the strength (or different type) of haptic effect generated at keyless entry device 140, the user may discern whether the user is getting closer to or further away from vehicle 110.

Figure 4:
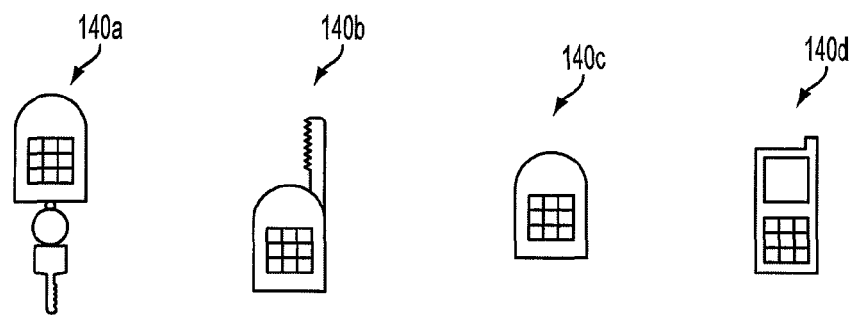
FIG. 4 illustrates examples of a keyless entry device, according to various implementations of the invention.

FIG. 4 illustrates examples of keyless entry device 140, according to various implementations of the invention. The example devices illustrated in FIG. 4 and other example devices in drawing figures are not exhaustive and are therefore non-limiting examples.

According to various implementations of the invention, keyless entry device 140 may include, for instance, a key fob 140a, a key fob with integrated key 140b, a smart key 140c, a cellular communication device 140d, and/or other device that may communicate one or more commands to vehicle 110 and receive one or more communications from vehicle 110. Keyless entry device 140a and 140b implementations may include various remote control key fobs known in the art. Keyless entry device 140c may include a smart key. The smart key may include various known devices that enable a user of the smart key to operate a vehicle without pressing buttons on the smart key. Such smart keys may also enable the user to start the vehicle engine by pressing a button inside the vehicle without using a mechanical key. Keyless entry device 140d may include a cellular communication device, such as a cellular telephone that is configured to communicate with the vehicle. In these implementations, for example, the cellular telephone may be configured to operate vehicle functions. In some implementations, keyless entry device 140d communicates with the vehicle via a telephone network, and/or via short-range communication protocol such as protocols used by key fobs known in the art.

Figure 5:
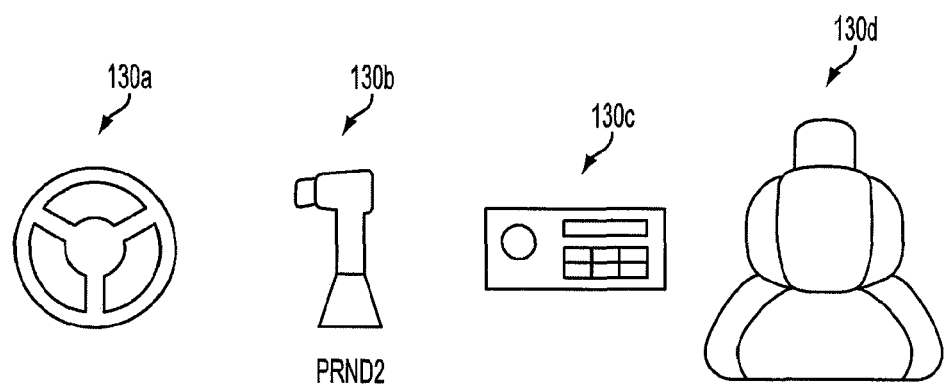
FIG. 5 illustrates examples of a vehicle interface component, according to various implementations of the invention.

FIG. 5 illustrates examples of vehicle interface component 130, according to various implementations of the invention. According to various implementations of the invention, vehicle interface component 130 may include, for instance, a steering wheel 130a, a transmission shifter 130b, a radio control 130c, seat 140d, and/or other interface device of vehicle 110. Vehicle interface component 130 may include an actuator (not otherwise illustrated in FIG. 5) that outputs a haptic effect in response to a control signal from vehicle 110. In this manner, vehicle 110 may communicate the vehicle information to user while the user is interfacing with or otherwise in contact with vehicle 110. For example, vehicle 110 may cause vehicle component 130 to generate a haptic effect that haptically communicates the vehicle information when the user starts vehicle 110 or otherwise interfaces with vehicle 110 (by turning on the radio, for example).

In some implementations, vehicle 110 may communicate the control signal to both vehicle interface component 130 and keyless interface device 140.

Figure 6:
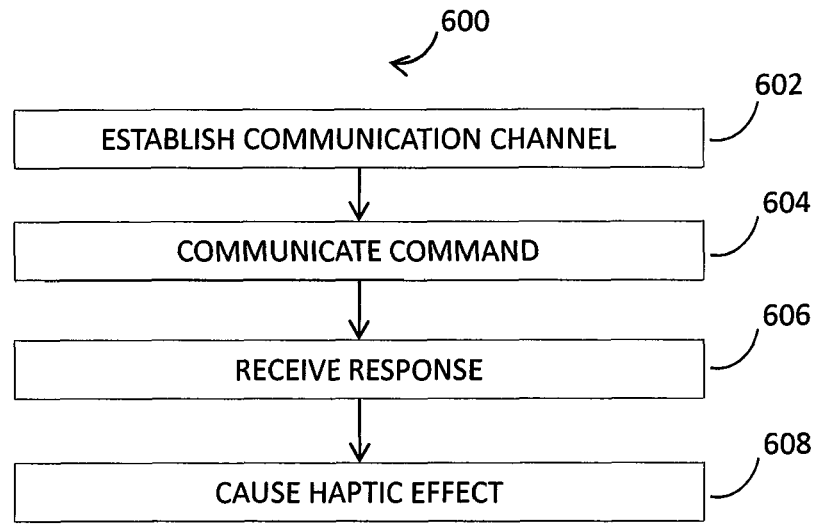
FIG. 6 is a flow diagram of an exemplary process for generating haptic feedback at a keyless entry device based on a response from a vehicle, according to various implementations of the invention.

FIG. 6 is a flow diagram of an exemplary process 600 for generating a haptic effect at keyless entry device 140 based on a response from vehicle 110, according to various implementations of the invention. The described operations for the flow diagram illustrated in FIG. 6 and in other drawing figures may be accomplished using some or all of the system components described in detail above and, in some implementations, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

According to various implementations of the invention, in an operation 602, a communication channel (such as communication channel 102) may be established by a keyless entry device (such as keyless entry device 140) with a vehicle (such as vehicle 110). In an operation 604, keyless entry device 140 may communicate a command to vehicle 110 to perform one or more vehicle functions. For example, a user operating keyless entry device 140 may press a lock button on keyless entry device 140 to lock car doors.

In an operation 604, keyless entry device 140 may receive a response from vehicle 110. In some implementations, the response may be related to the command. For instance, the response may acknowledge that the command has been received by vehicle 110 and/or otherwise indicate a status of the command such as a confirmation that the one or more vehicle functions have been successfully performed. In some implementations, the response may be unrelated to the command. For instance, the response may be include vehicle information that is unrelated to the command, such as a maintenance reminder and/or a warning that alerts the user to a dangerous condition related to vehicle 110. In this manner, when the keyless entry device 140 is used to communicate a command to lock car doors, for example, vehicle 110 may respond with a maintenance reminder, warning information, and/or or other vehicle information. In an operation 608, keyless entry device 140 may output a haptic effect based on the response from vehicle 110, thereby communicating the response at keyless entry device 140.

Figure 7:
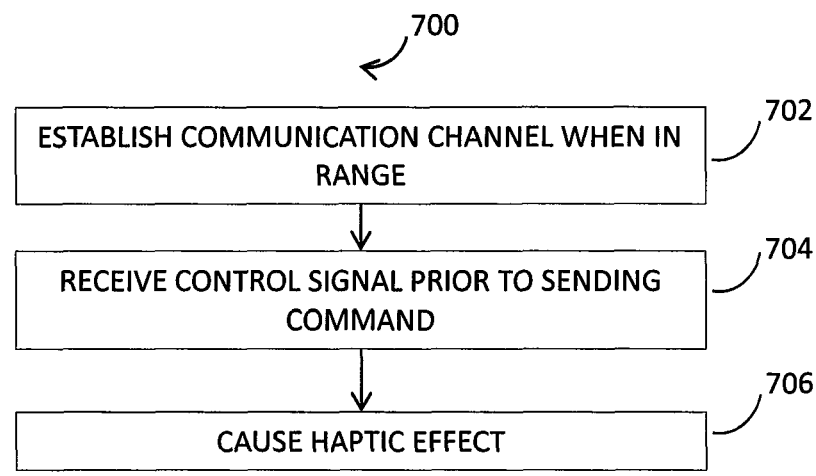
FIG. 7 is a flow diagram of an exemplary process for generating haptic feedback at a keyless entry device when in communication range with a vehicle, according to various implementations of the invention.

FIG. 7 is a flow diagram of an exemplary process 700 for generating haptic feedback at keyless entry device 140 when in communication range with vehicle 110, according to various implementations of the invention. According to various implementations of the invention, in an operation 702, a keyless entry device (such as keyless entry device 140) may establish a communication channel (such as communication channel 102) with a vehicle (such as vehicle 110) when keyless entry device 140 and vehicle 110 are within communication range of one another. In other words, communication channel 102 may be established when a determination is made that keyless entry device 140 and vehicle 110 are within communication range. In some implementations, vehicle 110 may make the determination. In other implementations of the invention, keyless entry device 140 may make the determination. In an operation 704, keyless entry device 140 may receive a control signal from vehicle 110 prior to communicating a command to vehicle 110 on communication channel 102. In this manner, vehicle 110 may communicate the vehicle information from vehicle 110 to keyless entry device 140 without user intervention (for example, without the user having knowledge that vehicle 110 and keyless entry device 140 are in range and/or when the user has not otherwise communicated a command to vehicle 110 using keyless entry device 140). In an operation 706, keyless entry device 140 may output a haptic effect based on the control signal. Thus, the user operating or otherwise in contact with keyless entry device 140 may be notified of vehicle information. For example, vehicle 110 may communicate proximity information that alerts the user that keyless entry device 140 is within communication range of vehicle 110 or otherwise provide the user with other vehicle information at keyless entry device 140.

Figure 8:
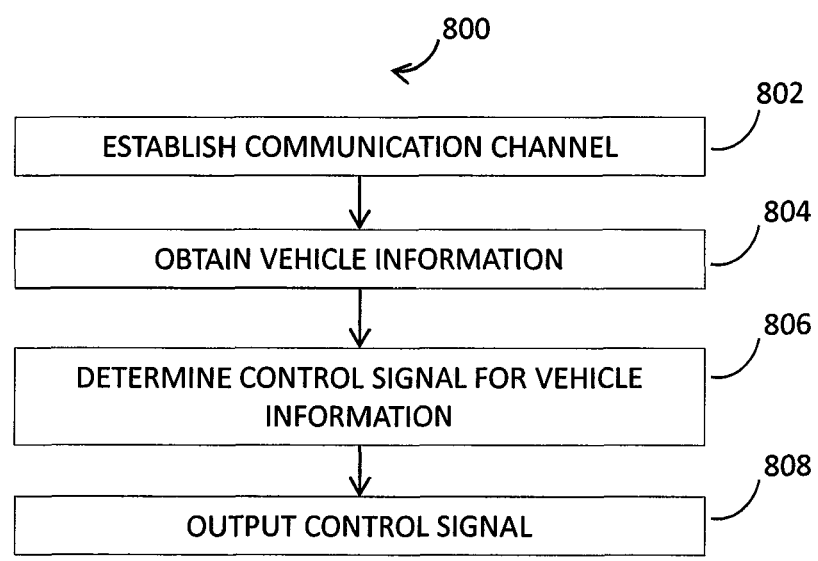
FIG. 8 is a flow diagram of an exemplary process for generating a control signal at a vehicle that causes haptic feedback at a keyless entry device, according to various implementations of the invention.

FIG. 8 is a flow diagram of an exemplary process 800 for generating a control signal at vehicle 110 that causes haptic feedback at keyless entry device 140, according to various implementations of the invention. According to various implementations of the invention, in an operation 802, a vehicle (such as vehicle 110) may establish a communication channel (such as communication channel 102) with a keyless entry device (such as keyless entry device 140). In an operation 804, vehicle 110 may obtain the vehicle information by retrieving and/or receiving the vehicle information from a memory (such as memory 234) or other vehicle component.

In an operation 806, vehicle 110 may determine a control signal based on the vehicle information. In other words, different control signals may be determined for different vehicle information. For example, a first control signal may be determined for an oil change reminder, a second control signal may be determined for a tune-up reminder, a third control signal may be determined for a low tire pressure warning, and/or other control signals may be determined for other vehicle information. In an operation 808, the control signal may be output to keyless entry device 140. The control signal may cause keyless entry device 140 to output a haptic effect that corresponds to the vehicle information. Thus, vehicle 110 may communicate the vehicle information by generating a corresponding control signal that causes keyless entry device 140 to output a haptic effect that haptically communicates the vehicle information.

Implementations of the invention may be made in hardware, firmware, software, or any suitable combination thereof. Implementations of the invention may also be implemented as instructions stored on a machine-readable medium, which may be read and executed by one or more processors. A tangible machine-readable medium may include any mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A keyless entry device, comprising:
    a transceiver configured to communicate, over a communication channel, with a vehicle;
    a haptic actuator coupled to a drive circuit; and
    a processor, coupled to the transceiver and the drive circuit, configured to:
        determine proximity information between the keyless entry device and the vehicle;
        select a control signal based on the proximity information, and
        output the control signal to the drive circuit to cause the haptic actuator to periodically or continuously generate a haptic effect to a user.

2. The keyless entry device according to claim 1, wherein the proximity information includes a distance between the keyless entry device and the vehicle.

3. The keyless entry device according to claim 2, wherein the processor determines the distance based on a strength of a signal communicated over the communication channel between the haptic entry device and the vehicle.

4. The keyless entry device according to claim 2, wherein the processor determines the distance based on a Doppler shift of a signal communicated over the communication channel between the haptic entry device and the vehicle.

5. The keyless entry device according to claim 2, further comprising:
    a Global Positioning System (GPS) receiver configured to generate GPS position information for the keyless entry device,
    wherein the processor determines the distance based on the GPS position information for the keyless entry device and GPS position information for the vehicle received over the communication channel.

6. The keyless entry device according to claim 2, wherein the proximity information includes a first distance determined at a first time and a second distance determined at a second time, and the processor is further configured to:
    select a first control signal for the first distance and output the first control signal to the drive circuit at the first time, and
    select a second control signal for the second distance and output the second control signal to the drive circuit at the second time, the second control signal being different than the first control signal.

7. The keyless entry device according to claim 6, wherein, when the second distance is greater than the first distance, the second control signal causes the haptic actuator to generate a stronger haptic effect than the first control signal.

8. The keyless entry device according to claim 6, wherein, when the second distance is smaller than the first distance, the second control signal causes the haptic actuator to generate a stronger haptic effect than the first control signal.

9. The keyless entry device according to claim 1, wherein the haptic actuator periodically or continuously generates the haptic effect after the keyless entry device is out of communication range with the vehicle.

10. The keyless entry device according to claim 1, wherein the communication range is based on the distance.

11. A method for generating haptic feedback at a keyless entry device having a processor, the method comprising:
    establishing a communication channel with a vehicle;
    determining proximity information between the keyless entry device and the vehicle;
    selecting a control signal based on the proximity information, and
    outputting the control signal to a drive circuit to cause a haptic actuator to periodically or continuously generate a haptic effect to a user.

12. The method according to claim 11, wherein the proximity information includes a distance between the keyless entry device and the vehicle, and the method further comprises:
    determining the distance between the keyless entry device and the vehicle based on at least one of:
        a strength of a signal communicated over the communication channel between the haptic entry device and the vehicle;
        a Doppler shift of a signal communicated over the communication channel between the haptic entry device and the vehicle; or
        GPS position information for the keyless entry device and GPS position information for the vehicle received over the communication channel.

13. The method according to claim 12, wherein the proximity information includes a first distance determined at a first time and a second distance determined at a second time, and the method further comprises:
    selecting a first control signal for the first distance and outputting the first control signal to the drive circuit at the first time, and
    selecting a second control signal for the second distance and outputting the second control signal to the drive circuit at the second time, the second control signal being different than the first control signal.

14. The method according to claim 13, wherein:
    when the second distance is greater than the first distance, the second control signal causes the haptic actuator to generate a stronger haptic effect than the first control signal, or
    when the second distance is smaller than the first distance, the second control signal causes the haptic actuator to generate a stronger haptic effect than the first control signal.

15. The method according to claim 11, wherein the haptic actuator periodically or continuously generates the haptic effect after the keyless entry device is out of communication range with the vehicle.

16. A non-transitory computer-readable medium storing instructions that, when executed by a processor of a keyless entry device, cause the keyless entry device to generate haptic feedback, the generating comprising: establishing a communication channel with a vehicle; determining proximity information between the keyless entry device and the vehicle; selecting a control signal based on the proximity information, and outputting the control signal to a drive circuit to cause a haptic actuator to periodically or continuously generate a haptic effect to a user.

17. The non-transitory computer-readable medium according to claim 16, wherein the proximity information includes a distance between the keyless entry device and the vehicle, and wherein the generating further comprises: determining the distance between the keyless entry device and the vehicle based on at least one of: a strength of a signal communicated over the communication channel between the haptic entry device and the vehicle; a Doppler shift of a signal communicated over the communication channel between the haptic entry device and the vehicle; or GPS position information for the keyless entry device and GPS position information for the vehicle received over the communication channel.

18. The non-transitory computer-readable medium according to claim 17, wherein the proximity information includes a first distance determined at a first time and a second distance determined at a second time, and wherein the generating further comprises: selecting a first control signal for the first distance and outputting the first control signal to the drive circuit at the first time, and selecting a second control signal for the second distance and outputting the second control signal to the drive circuit at the second time, the second control signal being different than the first control signal.

19. The non-transitory computer-readable medium according to claim 18, wherein: when the second distance is greater than the first distance, the second control signal causes the haptic actuator to generate a stronger haptic effect than the first control signal, or when the second distance is smaller than the first distance, the second control signal causes the haptic actuator to generate a stronger haptic effect than the first control signal.

20. The non-transitory computer-readable medium according to claim 16, wherein the haptic actuator periodically or continuously generates the haptic effect after the keyless entry device is out of communication range with the vehicle.

* * * * *